United States Patent [19]

Ingerson et al.

[11] Patent Number: 4,993,771
[45] Date of Patent: Feb. 19, 1991

[54] TRUCK TRUNK DEVICE

[76] Inventors: Sidney D. Ingerson, P.O. Box 248, Kenmare, N. Dak. 58746; Jerol H. Staael, Stanley, N. Dak. 58784

[21] Appl. No.: 359,092
[22] Filed: May 30, 1989
[51] Int. Cl.⁵ .............................................. B60R 9/00
[52] U.S. Cl. .................................................. 296/37.6
[58] Field of Search ............................... 296/37.6, 37.1; 224/42.42; 220/345, 346; 312/330.1; 108/40, 39

[56] References Cited

U.S. PATENT DOCUMENTS

| | | | |
|---|---|---|---|
| 698,558 | 4/1902 | Rosenbaum | 220/346 |
| 1,325,349 | 12/1919 | Burgess | 220/346 X |
| 4,488,669 | 12/1984 | Waters | 296/37.6 |
| 4,522,326 | 6/1985 | Tuohy, III | 296/37.6 X |
| 4,531,774 | 7/1985 | Whatley | 296/37.6 |
| 4,580,827 | 4/1986 | Feagan | 296/37.6 |
| 4,635,992 | 1/1987 | Hamilton et al. | 296/37.6 |
| 4,752,095 | 6/1988 | Brady | 296/37.6 |
| 4,848,588 | 7/1989 | Rasmussen | 220/345 X |

Primary Examiner—Margaret A. Focarino
Assistant Examiner—Gary C. Hoge
Attorney, Agent, or Firm—Robert E. Kleve

[57] ABSTRACT

The invention comprises a trunk for pickup trucks having a base with surrounding side walls and a horizontally slidable panel across the top of the box. The trunk is mounted on a pickup truck in the back behind the cab between the rear side panels of the truck. The trunk has guideway members along its front and rear side walls. The cover panel has cooperating guide members along its front and rear edge to enable the cover to slide off and on the trunk from either side of the box and truck. The guideway members are mounted in close proximity above the top edge of the rear side walls of the truck whereby the cover panel may slide over the side panels of the truck when opening and closing the trunk. The cover has an elongated handle bar along its front edge with downward projecting lug means at each end and for locking the cover closed over the box. The handle is slidable upward to raise the lugs above the side walls of the box to open the box by sliding the cover to one side or the other of the box and over one side wall or the other of the truck.

2 Claims, 2 Drawing Sheets

TRUCK TRUNK DEVICE

BACKGROUND OF THE INVENTION

This invention relates to truck boxes, more particularly, the invention relates to trunks for mounting to pickup trucks.

It is an object of the invention to provide a novel trunk having horizontally slidable cover with the box adapted to be mounted to the back of a pickup truck and the cover is slidable to either side of the box and truck over the top of the sides of the truck for opening the box.

It is a further object of the invention to provide a novel trunk for mounting to the back of a pickup truck which can be opened and closed without interfering with the mounting of a fifth wheeler type camper which may be mounted to the truck.

It is a further object of the invention to provide a novel trunk for mounting to the back of a pickup truck which can be opened from either side.

Further objects and advantages of the invention will become apparent as the description proceeds and when taken in conjunction with the accompanying drawings wherein:

DESCRIPTION OF THE EMBODIMENT

Briefly stated, the invention comprises a trunk or compartment having a base and surrounding sidewalls and guideway means along the front and rear upper edges of the compartment or box, a slidable cover slidably mounted in said guideway means of said compartment or box, mounting flanges on each sid of said compartment for mounting the compartment or box to the side walls of the back of a pickup truck with the compartment between the side walls of the truck, said guideway means being slightly above the upper edges of the side walls or side panels of the truck and a horizontal cover mounted in said guideway means whereby the horizontal cover may be slid horizontally to either side of the truck and compartment over either side wall or side panel of the truck for opening and closing the compartment handle means mounted to the horizontal cover to facilitate sliding the cover to either side of the side panels and compartment, said handle means being movable upward for unlatching the cover to the compartment with lug means on the handle for latching and unlatching the handle and cover.

Figure 1:
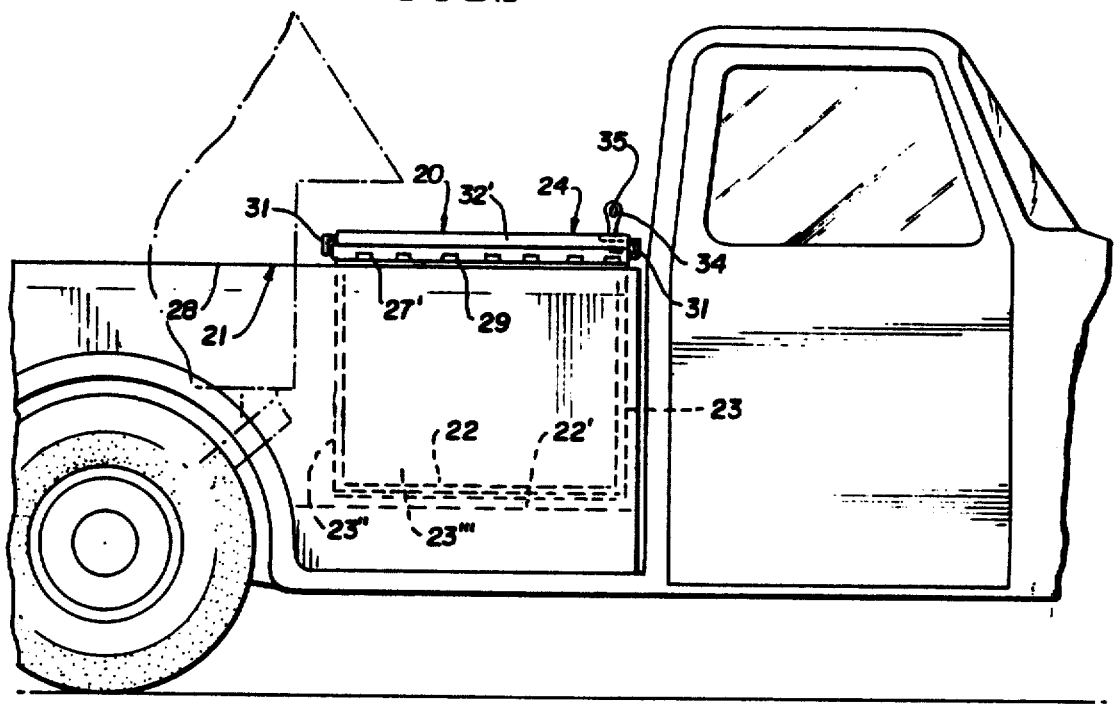
FIG. 1 is a side elevational view of the trunk shown mounted to the back of a pickup truck, with a fragmentary showing of the truck.
Figure 2:
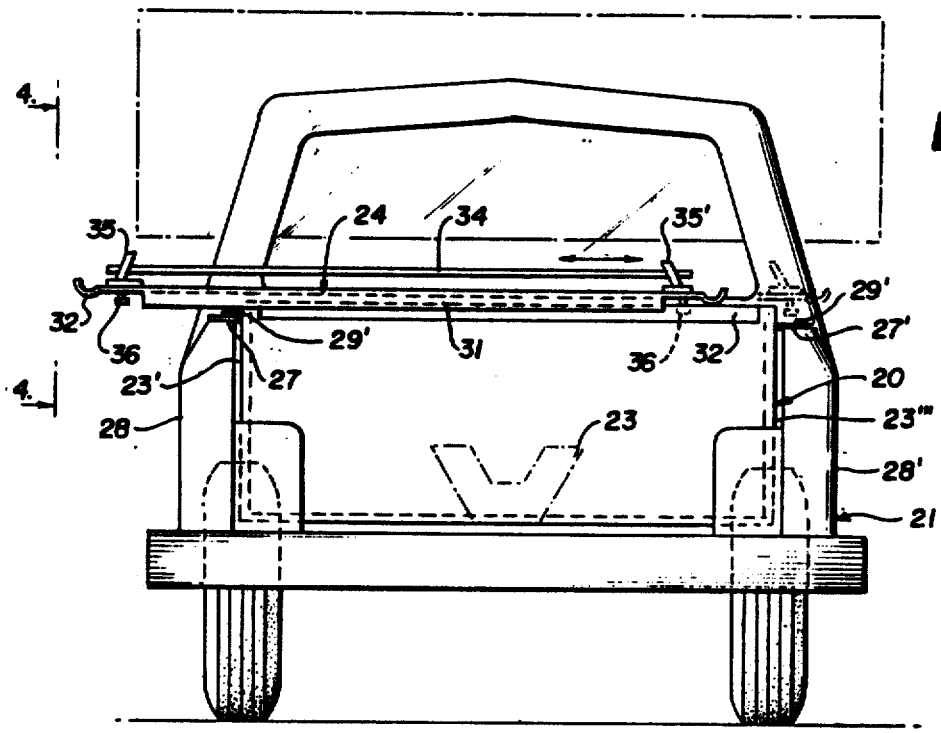
FIG. 2 is a rear elevational view o the trunk shown mounted to the back of a pick up truck.
Figure 3:
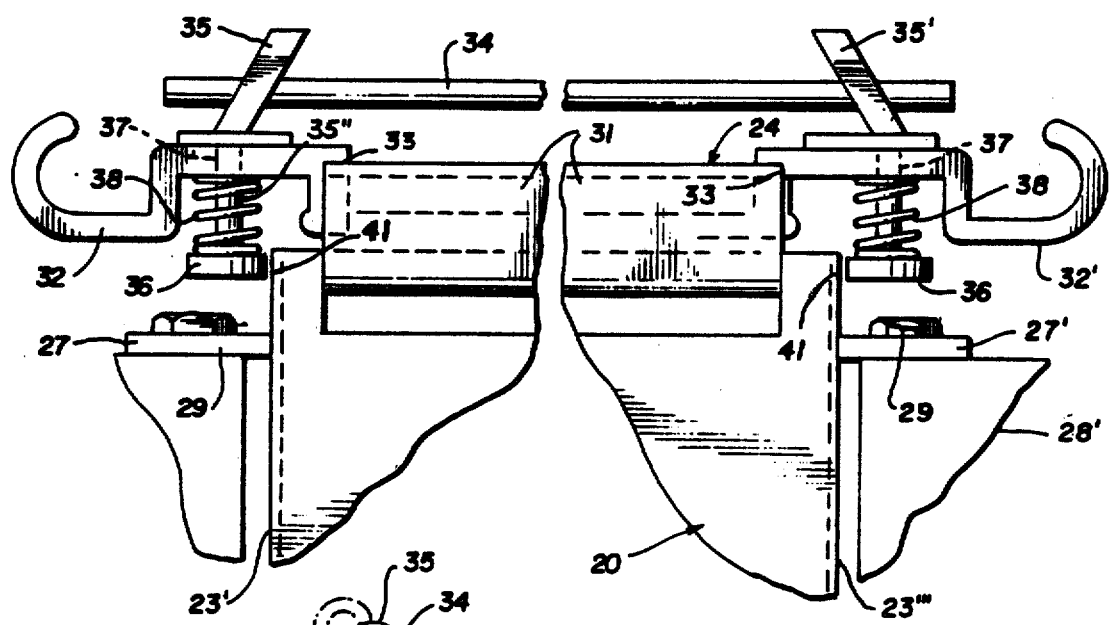
FIG. 3 is a fragmentary rear cross sectional view of the trunk and its mounting to the side panels of a pickup truck.

Referring more particularly to the drawings, in FIGS. 1 and 2, the storage compartment, box or trunk 20 is illustrated shown mounted to the back of a pick up truck 21 between the side panels 28 and 28' of the truck. The compartment, box or trunk 20 has a base 22 surrounding side walls 23, 2 23", and 23'" and a slidable, horizontal panel or cover 24. Horizontal guide members 25 and 25' are mounted horizontally across the upper edges of the front and rear walls 23 and 23" of the compartment or box and cooperating guideway members 26 and 26' are mounted to the outer front and rear edges of the cove or top panel 24. The guide members 26 and 26' engage the guideway members 25 and 25' and slide along the members 25 and 25' for sliding the cover in either direction for opening and closing the compartment or box.

The storage compartment, trunk, or box 20 has a pair of horizontal flanges 27 and 27' fixed to the upper portions of the side walls 23' and 23" of the compartment or trunk, which flanges extend over the top of the rear side walls or side panels 28 and 28' of the pickup truck. Bolts 29 extend through the flanges 27 and 27' and are threaded into the top of the side walls 28 and 28' to fix the compartment or trunk to the rear of the pickup truck, with the base 22 of the compartment slightly above the bottom 22' of the back of the truck so as not to rest on the floor of the truck.

The cover panel 24 has downturned flanges 30 and 30' at its front and rear edge, with horizontal mounting strips fixed thereto, and with the guideway members 25 and 25' fixed to the mounting strips 31 and 31' to fix the guideways 25 and 25' to the cover 24.

The guideway members 25 and 25' and 26 and 26' are made of plastic so that they will slide easily upon one another and the guideway members 25 and 25' fixed on the trunk are located above the top of the side panels 28 and 28' so that the cover will slide over the top of the side panels in either direction.

The left and right sides of the cover panel 24 have handle gripping channel members 32 and 32' which have slots 33 to fixedly receive the ends of the cover. The handle gripping members 32 and 32' may be used to manually slide the cover to one side or the other off or onto the box.

A horizontal rod 34 also acts as a handle for the cover. The rod 34 has column supports 35 and 35' fixed to each end. The column supports have rods 35" extending downward from the supports with lugs 36, 36' fixed t the lower ends of the rods. The rods 35" extend thru holes 37 in the cover panel, and have coil springs 38 and 38' attached to the rod portions 35" urging the rods and lugs and column supports downward in relation to the cover 24. The lugs 36 and 36' project down below the upper edge 41 of the sides 23" and 23"" to lock the cover closed over the top of the trunk. The holes 37 are larger than rods 35" and smaller than springs 38, 38'.

The horizontal rod 34 may be slide upward in a straight line to release one end of the cover, depending upon the end lifted, or the horizontal rod may be pivoted about the lower edge 40 of the column supports 35 and 35' to raise the lugs above the edges of the side walls 23" and 23"". When pivoting the rod as indicated both lugs are raised above the side walls so that the cover may be slide in either direction.

Figure 4:
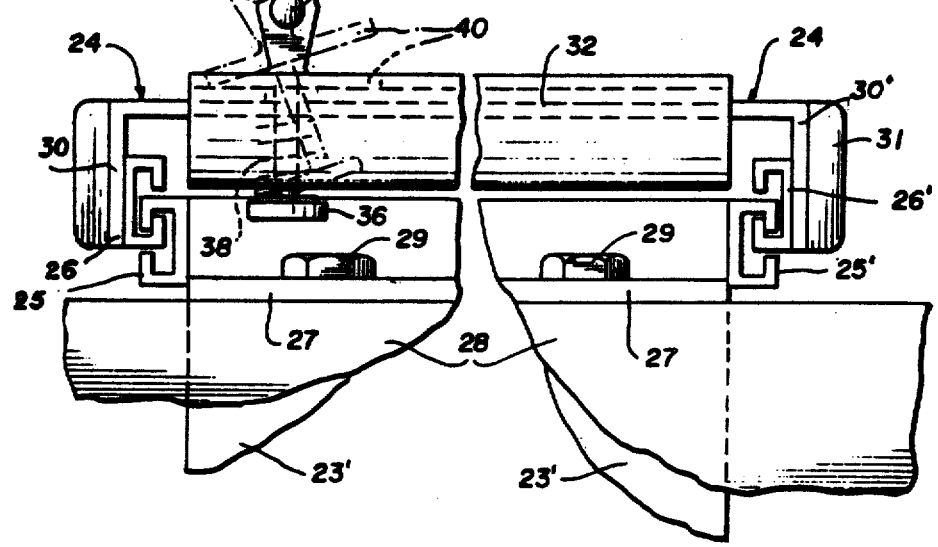
FIG. 4 is a fragmentary side cross sectional view of the trunk and its cover taken along line 4—4 of FIG. 2, with the locking handle for the cover shown in its locked position in solid lines and its raised unlocked or unlatched position in phantom lines.

OPERATION:

When the trunk has been installed in the back of a pick up truck by fixing the mounting flanges 27 and 27' to the side walls of the truck, the operator may slide the cover open from either the left or right side of the truck by sliding the cover either to the left or to the right side to open the trunk. This is accomplished by the operator pivoting the handle rod 34 counter clockwise from its position shown in solid lines in FIG. 4 to its position shown in dashed lines in FIG. 4 and designated by numeral 40. When pivoting the handle upward in opposition to the springs 38 and 38' both lugs 36 are raised above the top of the side walls 23" and 23"" so that the cover 24 may be slid toward or away from the operator toward one side or the other to open the trunk for introducing or removing articles into the trunk when using the trunk for storage.

The operator may slimply slide one end or the other upward by grasping either the support column 35 or 35' and raising that respective end of the rod 34, in which case only the lug 36 on that support column being raised is raised above the side walls of the trunk, so the cover can only be slide away from the operator to open the trunk assuming the column support adjacent the operator is the one being raised.

Cover 24, being in close proximity to the top of the side walls 28 and 28' of the truck, a conventional fifth wheeler trailer may be mounted on the pickup truck in the back as indicated in phantom lines and may remain operatively mounted to the pickup truck when opening the trunk, so that the trailer does not have to be removed from the truck to slide the cover 24 off to one side or the other to open and close the trunk.

Also, a conventional key lock 42 is also provided with a projecting lug to project into the cover to lock the cover closed. A fragmentary showing of a fifth wheeler camper and mounting is illustrated in FIGS. 1 and 2 in phantom lines.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein:

What is claimed is:

1. A trunk for mounting to the back of a pickup truck wherein said truck has a base with left and right side panels, said trunk comprising a base with front and rear side walls and left and right side walls, said trunk having projecting flange means along the left and right side walls of the trunk for mounting the trunk to the side panels of the truck, said trunk having a single horizontal sliding cover panel extending across substantially the entire top of the trunk, horizontal guideway means along the front and rear walls of the trunk, said cover and said guideway means being above the tops of the side panels of the truck for guiding the cover along a horizontal path over the tops of either the left side walls of the trunk and over the tops of either the left or right side panels of the truck, elongated handle means extending horizontally along the top of said cover from the left side wall of the trunk to the right side wall of the trunk, latch means adjacent said handle means and connected to said elongated hand means to releaseably latch said cover to said side of the trunk in response to movement of the handle means.

2. A trunk for mounting to the back of a vehicle wherein said vehicle has a base with left and right side panels, said vehicle comprising a base with front and rear side walls and left and right side walls, said trunk having projecting flange means along the left and right side walls of the vehicle for mounting the vehicle to the side panels of the vehicle, said trunk having a single horizontal sliding cover panel extending across substantially the entire top of the trunk, horizontal guideway means along the front and rear walls of the trunk, said cover and said guideway means being above the tops of the side panels of the vehicle for guiding the cover along a horizontal path over the tops of either the left or right side walls of the trunk and over the tops of either the left or right side panels of the vehicle, releasable latch means to latch said cover panel closed over the top of the trunk, handle means having hand operated portions adjacent both the left and right side walls and connected together to be hand operated from a location adjacent either the left or right side wall of the trunk to release said latch means so that said cover panel may be slid on said guideway means from its closed position to a position over either the left or right side wall of the trunk to open respectively the right or left top portions of the trunk.

* * * * *